(12) United States Patent
Jaime et al.

(10) Patent No.: US 7,966,953 B2
(45) Date of Patent: *Jun. 28, 2011

(54) PLANTER WITH DIRECT HYDRAULIC SEED DRIVE

(75) Inventors: Richard J. Jaime, Burr Ridge, IL (US); Michael Connors, Lockport, IL (US); Leonard A. Bettin, LaGrange Park, IL (US); Rodney Samuel Horn, Woodridge, IL (US)

(73) Assignee: CNH America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/817,783

(22) Filed: Jun. 17, 2010

(65) Prior Publication Data
US 2010/0251948 A1 Oct. 7, 2010

Related U.S. Application Data

(62) Division of application No. 12/048,824, filed on Mar. 14, 2008, now Pat. No. 7,762,201.

(51) Int. Cl.
*A01C 5/00* (2006.01)
*A01C 7/00* (2006.01)
*A01C 7/18* (2006.01)
*A01C 9/00* (2006.01)

(52) U.S. Cl. ............ 111/55; 111/78; 111/185; 111/200; 111/921

(58) Field of Classification Search ................. 111/200, 111/921, 922, 70, 77, 78, 55, 177–185
See application file for complete search history.

(56) References Cited

U.S. PATENT DOCUMENTS

| | | |
|---|---|---|
| 4,581,955 A | 4/1986 | Wentzell |
| 4,715,302 A | 12/1987 | Briggs |
| 5,197,803 A | 3/1993 | Wall et al. |
| 6,050,355 A | 4/2000 | Beck, Jr. |
| 2002/0043194 A1 | 4/2002 | Kinzenbaw et al. |

*Primary Examiner* — Christopher J. Novosad
(74) *Attorney, Agent, or Firm* — Rebecca Henkel

(57) ABSTRACT

The invention provides an innovative yet straightforward approach to driving the seed distribution system in planters which feature hinged winged extensions. The flexibility of the hinged winged extensions may allow the planter to adjust to the contours of a field and to fold to facilitate transport of the planter. In one embodiment, for example, the invention may provide a mechanical coupling between several sections of a seed drive shaft which may support and be driven by a hydraulic motor for each of the winged sections. The seed drive system may also be coupled to row units to synchronize and power the distribution of seeds by the planter.

5 Claims, 5 Drawing Sheets

PLANTER WITH DIRECT HYDRAULIC SEED DRIVE

CROSS REFERENCE TO RELATED APPLICATIONS

This Patent Application is a Divisional of co-pending U.S. patent application Ser. No. 12/048,824, filed on Mar. 14, 2008 entitled, now U.S. Pat. No. 7,762,201 "Planter With Direct Hydraulic Seed Drive" and having Richard J. Jaime et al. as the Applicant.

BACKGROUND

The present invention relates generally to agricultural implements, and more particularly to a planter or similar implement designed to be towed behind a work vehicle, and that is equipped with a seed distribution system.

A wide range of agricultural implements are known and are presently in use, particularly designed for towing behind a work vehicle, such as a tractor. In one family of such implements, including tillers, planters, and so forth, a wide swath of ground can be tilled, planted, or otherwise worked in each pass of the implement in a tilled or untilled field. Planters, for example, often include frames supported by series of wheels and a tool bar extending transversely with respect to a line of movement of the implement across the field. Seed tanks are typically supported on the implement support structure, such as just forward of or over the tool bar. Large amounts of seed may be poured into these tanks and, as the implement is advanced across the field, seeds are transferred from the tanks by the distribution system connected to the row units. Attached to the tool bar are a series of row units for dispensing seeds in parallel rows either in tilled or untilled soil. Row units may contain various mechanical components to facilitate seed distribution such as a seed wheel and other mechanisms. These mechanisms help regulate seed population and set seed spacing in the soil.

Seed distribution mechanisms are typically driven via sprockets and chains using a ground-contacting drive wheel or a hydraulic motor as their prime movers. Sprocket and chain mechanisms require tedious adjustments and maintenance by the operator, including frequent lubrication. The operator may be required to manually adjust and move the chain between differently sized drive sprockets in order to achieve a desired geometry, resulting in proper seed distribution. A loose chain will result in inefficient drive motion transfer from the wheel or motor to the driveshaft. Moreover, efficiency of the mechanism may be reduced by debris that may interfere with the chain-sprocket connection. While this, in certain situations, may not pose particular problems, it requires additional maintenance and adjustment, such as regular tightening of the chain-sprocket mechanisms.

There is a need, therefore, for improved seed drive mechanisms in planters that are more efficient and require less maintenance. There is a particular need for seed drive mechanisms that reduce or eliminate the use of chains and sprockets.

BRIEF DESCRIPTION

The invention provides an innovative yet straightforward approach to driving the seed distribution system in agricultural implements. The invention may be used in a wide range of settings, but is particularly well-suited to implements such as seeders, planters, plows, and so forth in which flexible winged extensions can be raised and lowered by automatic mechanisms for transport. In addition, the flexibility of the hinged winged extensions may allow the planter to adjust to the contours of a field. In one embodiment, for example, the invention may provide a mechanical coupling between several sections of a seed drive shaft which may support and be driven by a hydraulic motor for each of the winged sections. The seed drive system may also be coupled to row units to synchronize and power the distribution of seeds by the planter. The coupling of the drive shaft sections enable the seed drive system to operate as the winged extensions are drawn over changing elevations. Further, the flexible nature of the drive mechanism coupling allows the wings to fold for transport without adjustment to the mechanism or shafts.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
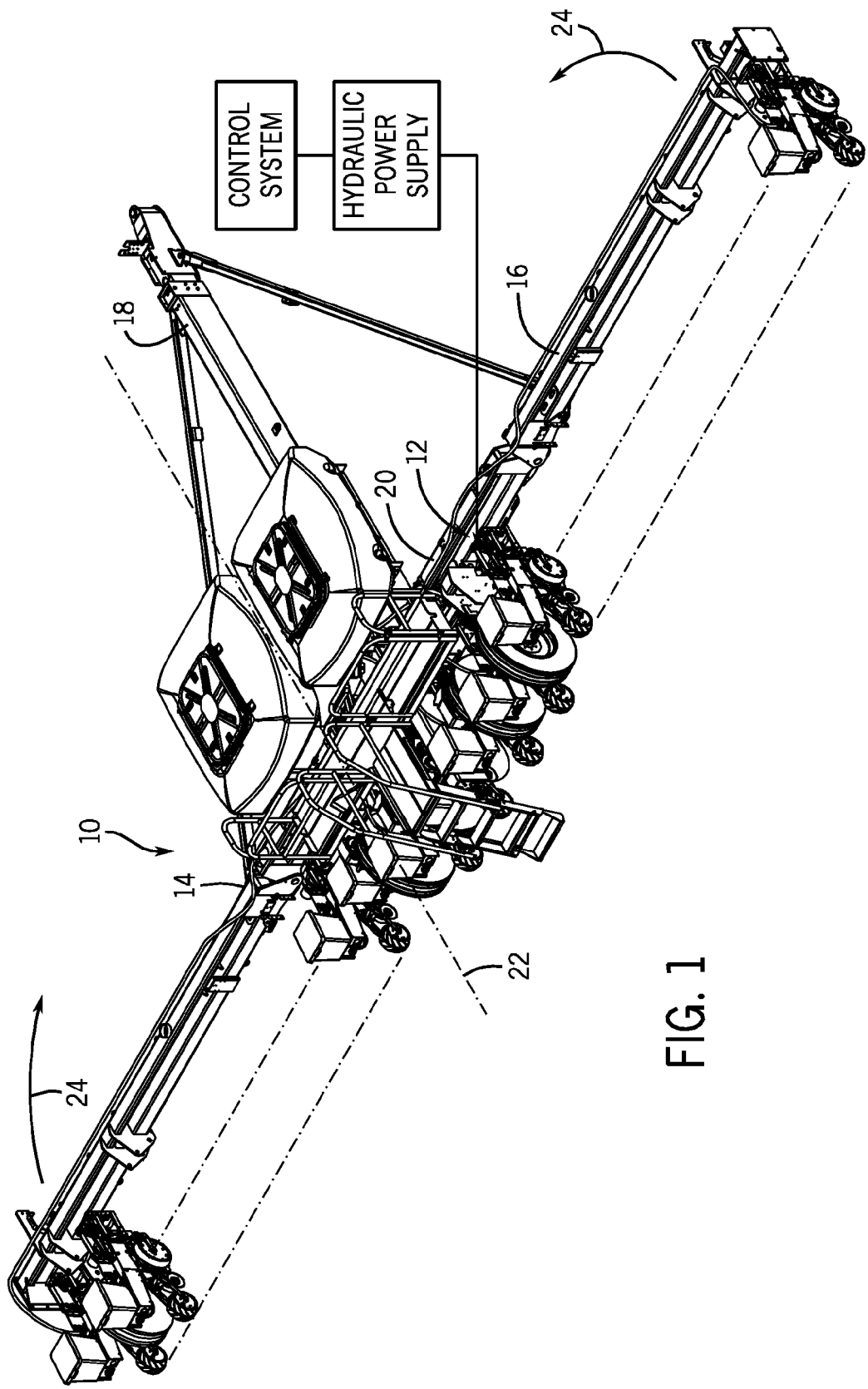
FIG. 1 is a rear perspective view of a planter in accordance with aspects of the invention, including a seed drive system, frame, tow bar, and tool bar.

Turning now to the drawings, and referring first to FIG. 1, a planter 10 is shown, having a seed drive system 12. The planter is designed to be towed behind a work vehicle, such as tractor (not shown). As will be appreciated by those skilled in the art, the seed drive system is coupled to a power supply and a control system, represented as a block diagram for the sake of simplicity. The power supply and control system are used to regulate the seed drive system to attain desired seed spacing as well as to account for overall speed of the implement. The power supply will generally include a hydraulic power supply (not separately shown) that provides a flow of pressurized hydraulic fluid for driving parts of the seed drive system, as described below. The hydraulic power supply itself may be driven by a motor (not shown) or by the tractor itself (e.g., by a power takeoff shaft), or may be part of the tractor hydraulic system.

The planter 10 consists of a frame, designated generally by reference numeral 14, which may be made of any suitable material, such as structural steel. The frame 14 further includes a tool bar 16 secured generally transverse to a tow bar 18. The tow bar 18 of the frame 14 forms a fore-end-aft longitudinal beam designed to be connected to the towing work vehicle. In the present embodiment, the tool bar 16 includes a center section 20 which is coupled to the tow bar 14 and supports central components of the planter such as seed tanks. Planter 10 is generally symmetrical about centerline 22, with wings on each side of the tow bar. Centerline 22 generally runs in the same direction as the implement in towed, above the tow bar 18. The wings may be folded forward, generally depicted by arrows 24, during road transport of the planter, thereby reducing the width of the implement.

Figure 2:
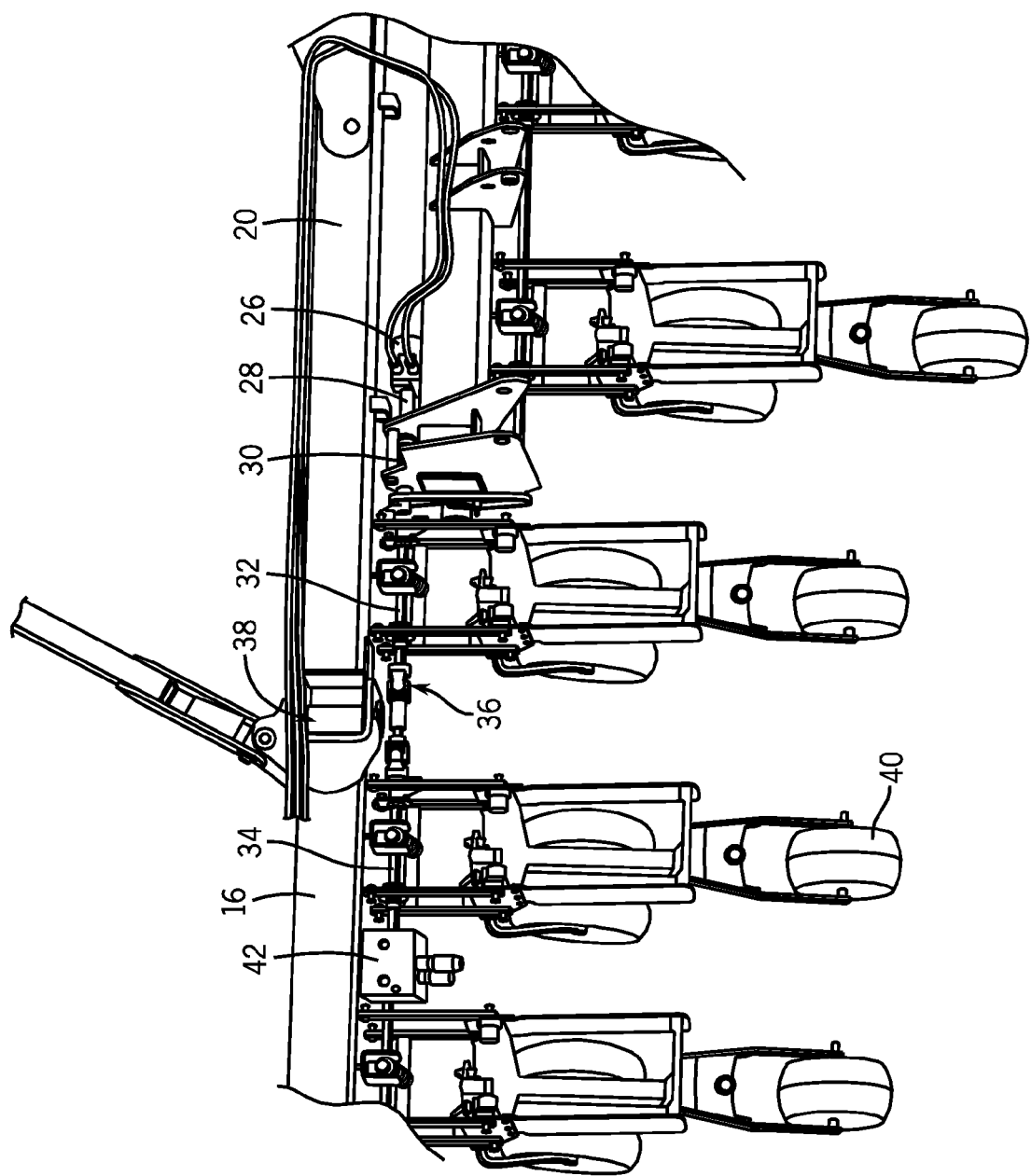
FIG. 2 is a top view of the central portion of the planter's tool bar wing, showing several components of the seed drive system as well as portions of the row units.

As shown in somewhat greater detail in FIG. 2, the view of a central portion of the planter shows the seed drive system components of the present embodiment, including hydraulic motor 26 connected to a coupling 28. As will be appreciated by those skilled in the art, hoppers and other components of the row units are removed to enhance clarity. The coupling 28 is attached to jackshaft 30, shown here as a shaft with a hexagon cross-section. In the present embodiment, other components of the mechanism include inner hex shaft 32, which is flexibly coupled to outer hex shaft 34 by universal joint 36. The drive shafts may be made of any suitable material, such as rolled steel. As those skilled in the art will appreciate, the geometric shape of the drive shafts may be varied to meet particular application and manufacturing requirements. The universal joint 36 is connected alongside tool bar pivot 38, both of which allow the outer portions of tool bar 16 to change in elevation as the row units and wheeled supports 40 travel along the contours of the soil. The hydraulic power supply is connected to hydraulic flow control valve 42, which regulates the speed of hydraulic motor 26, thereby controlling seed distribution.

Figure 3:
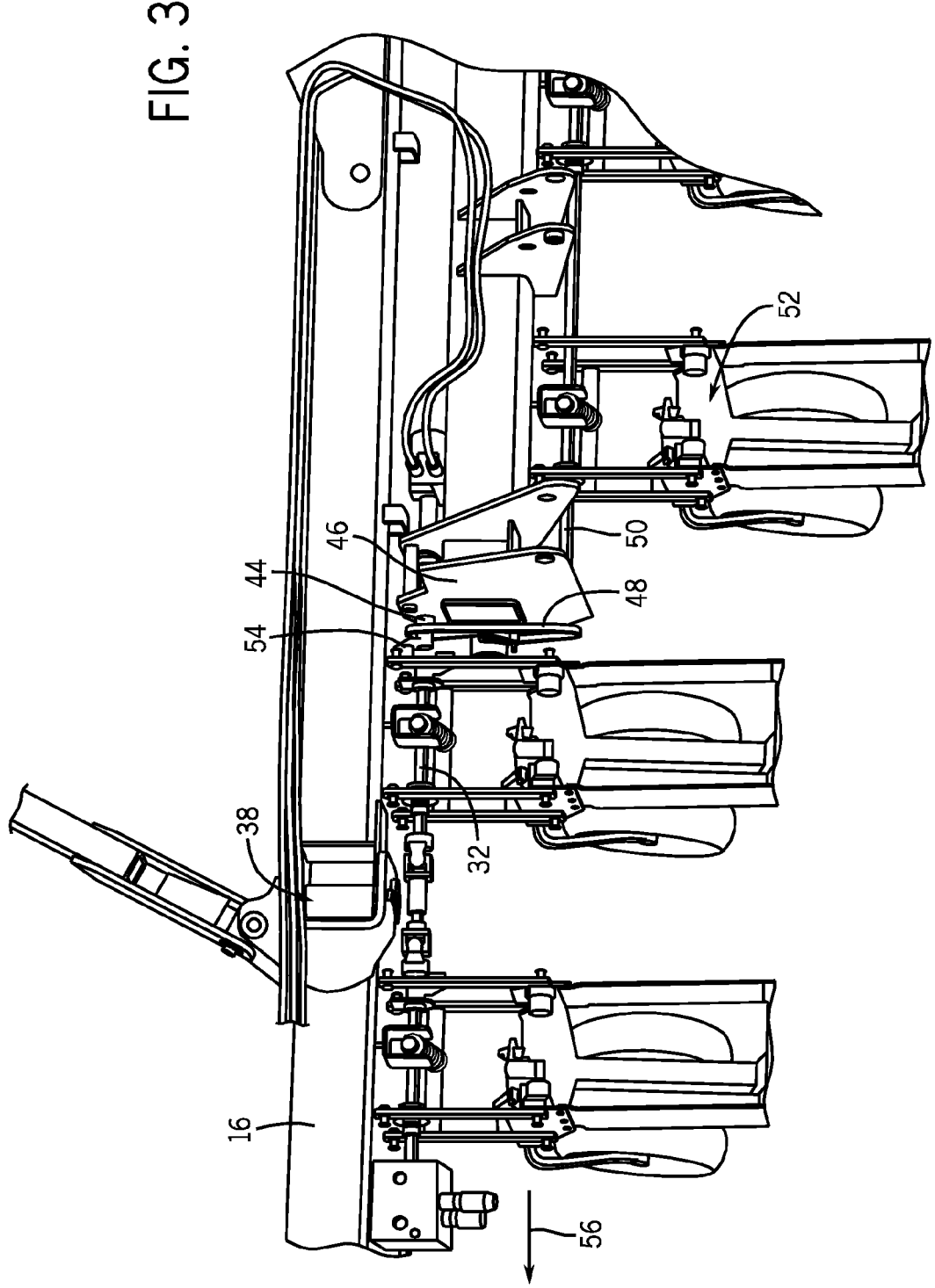
FIG. 3 is a more detailed view of the arrangement in FIG. 2, including the pieces of the driveshaft, the secondary parallel driveshaft, and the drive mechanism connecting them.

FIG. 3 shows a detailed view of the direct seed drive system. Components of the drive shafts are mounted and aligned using bearings, designated generally by reference numeral 44. Bracket 46 may couple bearings 44 to the center section of the toolbar. In the embodiment, the motor 26 may be mechanically supported by bearings 44, coupling 28 and jackshaft 30. The jackshaft is connected via chain and sprocket 48 to a secondary parallel shaft 50. Central row units 52 and their seed systems are driven by parallel shaft 50. In this embodiment, the central row units 52 are set back on the rear portion of the frame to allow folding of the tool bar wings and to allow space for other components such as seed tanks and the seed distribution system. As will be appreciated by those skilled in the art, the row units may serve various functions, depending upon the design, the nature of the field to be planted (e.g., tilled or untilled), the particular seeds to be planted, and so forth.

Structures of each row unit may typically include an opener disc, a metering system, a covering disc, a firming wheel, and so forth. For the sake of clarity, many components of the row units are not pictured. Accommodations may be made for fertilizers, dispensing of fertilizers, chemical distribution, and the like. The row units are spaced apart and staggered along the frame and tool bar to provide the desired spacing of rows of crops after seeding. The figure also shows a paddle coupling 54, which allows the seed drive system to connect to the wing row units, continuing in a direction designated generally by arrow 56. Moreover, the flexibility in the seed drive system 12 provided by the paddle coupling 54 allows the wings that comprise each side of tool bar 16 to fold for transport without any adjustment to the drive mechanism. That is, the paddles 54 and the drive mechanism do not require any alteration when the planter's wings are folded to a transport position. This is due to the fact that the paddles 54 allow for complete separation of the drive mechanism when the wings are folded. The folding of the wings for transport and the wing movement due to changes in elevation may be described as flexing movement.

Figure 4:
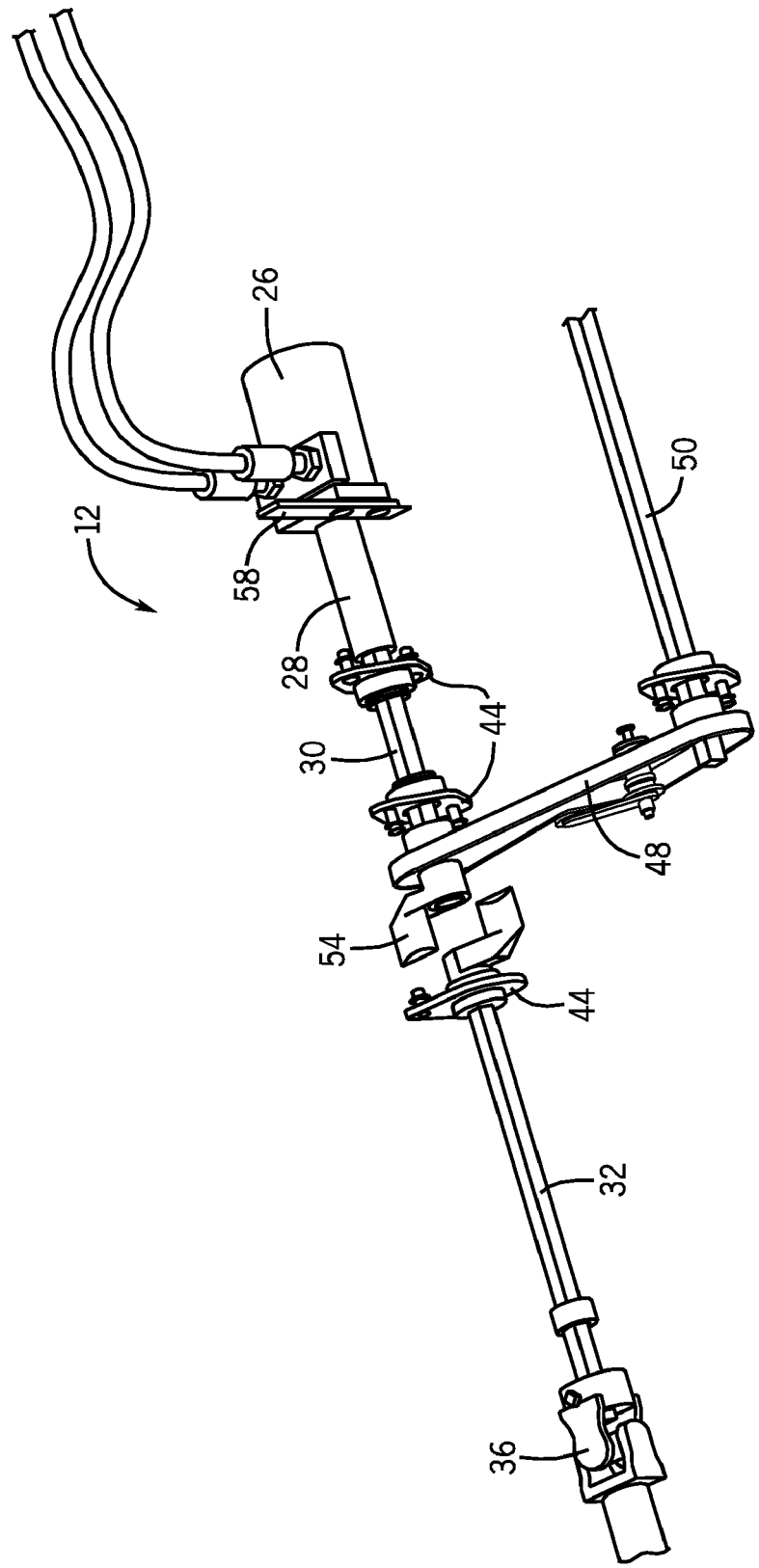
FIG. 4 is an isolated view of the seed drive system.
Figure 5:
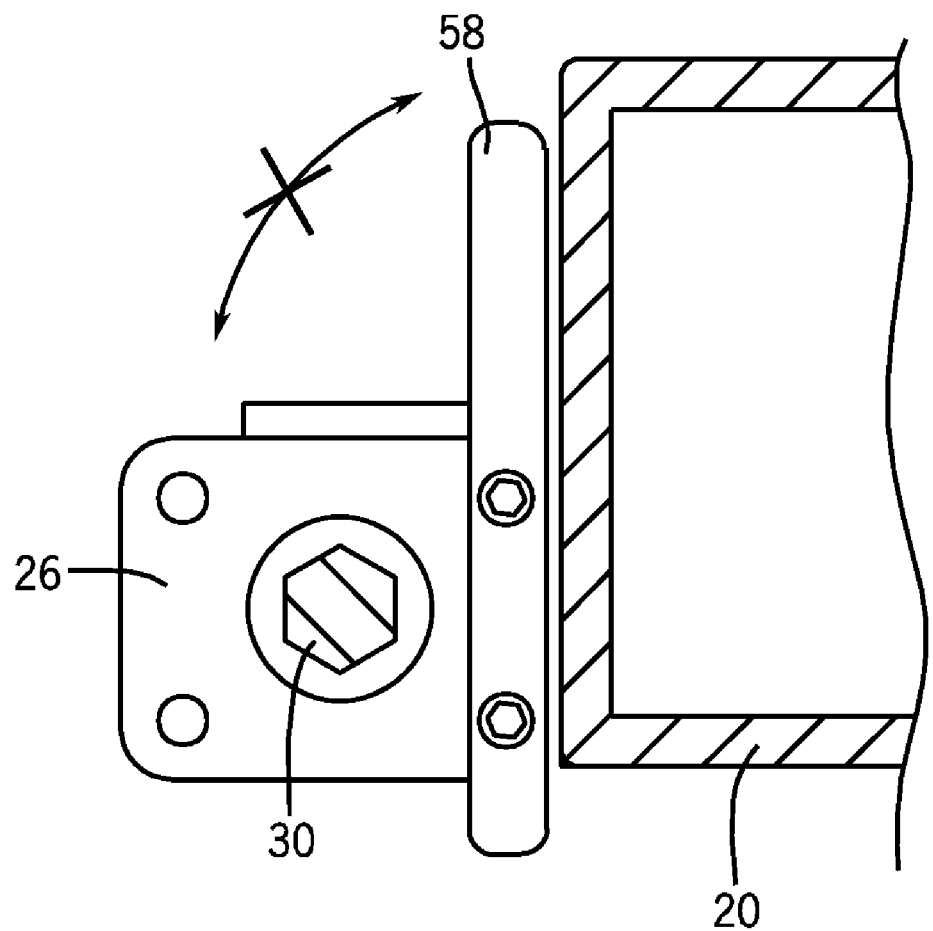
FIG. 5 shows a side cut-away view of the motor, tool bar, and anti-rotation member.

An isolated view of the seed drive system 12 is illustrated by FIG. 4. Hydraulic motor 26, coupling 28, and hex shaft 32 are shown. Bearings 44 provide mounting locations and alignment for components of the seed drive system. In the present embodiment, the hydraulic motor 26 is suspended by the coupling 28 and is prevented from rotation about the drive shaft axis by anti-rotation member 58. This anti-rotation feature is shown in more detail in FIG. 5, which is a view along the axis of jackshaft 30.

As will be appreciated by those skilled in the art, a seed drive system 12 may be displaced on each of the two wings that comprise the tool bar 16. That is, two seed drive systems 12 are typically placed on a planter, one on each wing of tool bar 12, located on either side of tow bar 18. Further, the components of the drive mechanism are variable, depending upon many factors, including planter configuration and size.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seed drive system on a planter comprising:
   a frame supporting a tool bar having wings on each side and configured to be towed across a field to be planted, the tool bar extending on opposite sides of a transverse centerline;
   a plurality of row units supported by the tool bar on both sides of the transverse centerline, each row unit being configured to dispense seeds at a desired spacing;
   a pair of drive shaft assemblies mechanically coupled to the row units on respective sides of the transverse centerline and configured to drive the associated row units to synchronize dispensing of the seeds; wherein each pair of the drive shaft assembly includes multiple drive shaft sections mechanically coupled to one another to permit flexing of the tool bar;
   a pair of hydraulic motors each coupled directly to a respective drive shaft assembly for driving the associated drive shaft assembly in rotation during operation of the planter; and
   a paddle coupling configured to interface said pair of drive shaft assembly sections to one another; wherein said paddle coupling allows said wings on each side of said toolbar to fold for transport without adjustment to said seed drive system.

2. The planter of claim 1, wherein each hydraulic motor is mechanically supported as an overhung load on the respective drive shaft assembly.

3. The planter of claim 2, comprising antirotation members coupled to each motor and configured to contact stationary elements of the planter to prevent rotation of the respective motor as the associated drive shaft assembly is driven in rotation.

4. The planter of claim 1, wherein each drive shaft assembly is mechanically coupled to the respective row units by respective sprockets and chain drive arrangements.

5. The planter of claim 1, wherein each drive shaft assembly includes multiple drive shaft sections mechanically coupled to one another to permit flexing of the tool bar.

* * * * *